July 9, 1935. J. A. BOHNSACK Re. 19,634

FLOOR SHIM

Original Filed Sept. 17, 1927

INVENTOR.
John A. Bohnsack
BY
Fay, Oberlin & Fay
ATTORNEYS

Reissued July 9, 1935

Re. 19,634

UNITED STATES PATENT OFFICE 19,634

FLOOR SHIM

John A. Bohnsack, Cleveland Heights, Ohio, assignor to The E. F. Hauserman Company, Cleveland, Ohio, a corporation of Ohio Original No. 1,675,593, dated July 3, 1928, Serial No. 220,118, September 17, 1927. Application for reissue February 18, 1935, Serial No. 7,149

2 Claims. (Cl. 189—34)

The present improvement relates to a metallic building element suitable for use in leveling a sectional metallic partition in course of erection when it is necessary to erect said partition across an uneven floor.

It is among the objects of this invention to provide a floor shim which is economical to manufacture, easily installed, requires no cutting in the field, and is concealed by the balance of the installation. Other objects and advantages will appear as the description proceeds.

The invention consists of the features hereinafter described and particularly pointed out in the claims; the following description and the annexed drawing setting forth but one illustrative embodiment of the various forms in which the principle of the invention may be applied.

In said annexed drawing:—

Figure 1:
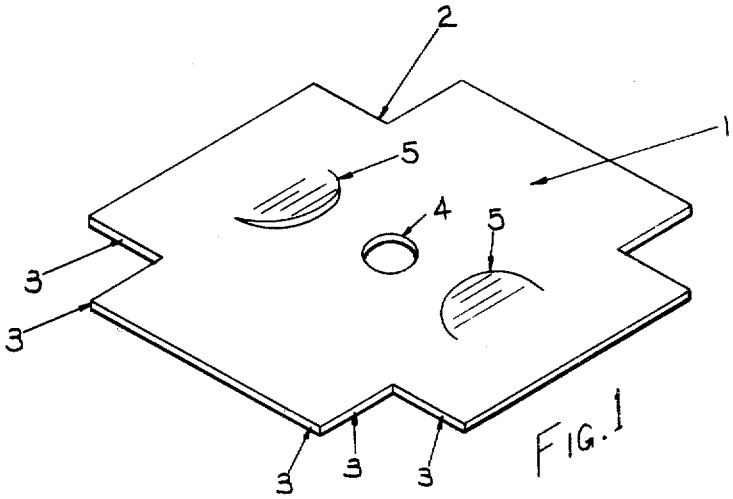
Figure 2:
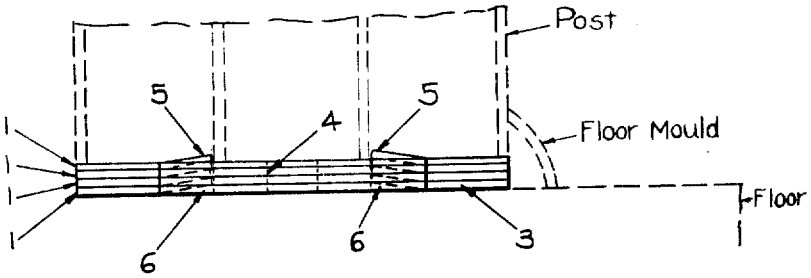
Figure 3:
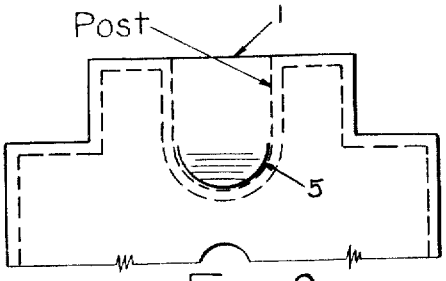

Fig. 1 is a perspective view of a single floor shim; Fig. 2 is an edgewise view of a pile of floor shims exhibiting the interlocking feature; and Fig. 3 is a plan view showing partial assembly.

The floor shim 1 as shown is a thin sheet metal stamping being so shaped as at corner 2 that it conforms to the maximum contour of the post or its equivalent which it is desired to shim up. As the details of said contour will vary with individual cases and types it is not the province of this invention to designate the shape but rather the feature that the floor shim shall give maximum support to all the parts resting thereon and at the same time shall not project so as to interfere with post cap, plinth, floor mould or other trim located thereamout.

By virtue of the above described formation of floor shim 1 it is possible for said trim members to extend vertically downwards past the edge 3 of said floor shim 1, or the pile thereof (Fig. 2) as the case may be, thereby enabling the trim members to contact with the uneven floor whilst the body of the partition is enabled to assume a horizontal position.

An opening 4, or a plurality thereof as the case may be, is provided through which to insert and fasten the clamping element, such as a lag screw, which is to secure the partition to the floor.

In order to shim up the necessary distance at any point it is only necessary to make a pile, Fig. 2, of the required number of floor shims 1 with their interlocking tongues 5 fitting into the corresponding recesses 6 of the floor shim above.

The interlocking tongue 5 is so located and designed in any particular case as to conform to and fit into a convenient recess in the portion of the partition resting immediately thereon. Thus it will be seen that the entire pile of floor shims, Fig. 2, are readily held in alignment with each other and with the partition thereabove.

Other modes of applying the principle of this invention may be employed instead of that explained, change being made as regards the features herein disclosed, provided the means stated by any of the following claims or the equivalent of such stated means be employed.

I therefore particularly point out and distinctly claim as my invention:—

1. A stack of floor shims for metallic building units, said shims being contoured to provide maximum support for the superposed structure, and to not interfere with concealing elements of the structure located thereabout, each shim having a projection on one face and a recess on the other face nesting with the contiguous shims.

2. A floor shim for metallic building units contoured to provide maximum support for the superposed structure, and to not interfere with concealing elements of the structure located thereabout; said floor shim having an opening therethrough for the insertion of clamping screw and having an interlocking tongue projecting therefrom adapted to serve the double purpose of aligning said floor shim with the superposed structure and of aligning one floor shim with another when a plurality of same are used in a pile.

JOHN A. BOHNSACK.